July 24, 1962 W. PLANERT 3,045,574
CINEMATOGRAPHIC OR PHOTOGRAPHIC CAMERAS
Filed April 27, 1960 3 Sheets-Sheet 1

Inventor
WOLFGANG PLANERT
By *Irwin S. Thompson*
Attorney

July 24, 1962 W. PLANERT 3,045,574
CINEMATOGRAPHIC OR PHOTOGRAPHIC CAMERAS
Filed April 27, 1960 3 Sheets-Sheet 3

Inventor
WOLFGANG PLANERT
By Irwin S. Thompson
Attorney

United States Patent Office 3,045,574
Patented July 24, 1962

3,045,574
CINEMATOGRAPHIC OR PHOTOGRAPHIC
CAMERAS
Wolfgang Planert, Dresden, Germany, assignor to VEB
Kamera- und Kinowerke Dresden, Dresden, Germany
Filed Apr. 27, 1960, Ser. No. 25,154
5 Claims. (Cl. 95—45)

The invention relates to a photographic camera having an objective turret head and to an arrangement for the distance-setting and reading off of the depth-of-focus set, with a basic objective lens situated in each case in the picture-taking position.

It is already known, for the common distance-setting of objective lenses arranged on the turret head of a photographic camera, to provide a distance-setting ring disposed coaxially with the turret head, on actuation of which the entire turret head is shifted along the optical axes of the objective lenses mounted therein. The turret head carries for each objective lens a pertinent distance scale and the distance-setting ring carries an index mark cooperating therewith. For cameras equipped in this way however it is only possible to use objective lenses with similar distance-setting characteristics, that is to say only those which can be shifted axially by the same amount for setting to a specific distance. An arrangement for ascertaining the depth-of-focus set in each case is not here provided.

In other known cameras objective lenses with different distance-setting characteristics are mounted on the turret head and their distance-setting elements are coupled with one another. The pitches of the screw threads serving for the respective distance-setting adjustments are adapted to one another so that all the objective lenses are always adjusted to the same distance. Such objective couplings are therefore complicated and the price of the cameras is increased. The reading off of the depth-of-focus takes place directly on the scales of the individual objective lenses provided for this purpose. Since on these known cameras a coupling of the diaphragm aperture mechanisms of the individual turret head objective lenses with an arrangement for the photo-electric exposure control is not possible or is only possible in the case of interposition of complicated gearing, it has been proposed to effect the change of focal length by selectively positioning different objective lens front attachments in front of a basic objective lens installed in the camera, the basic objective lens being coupled with the exposure control arrangement of the camera.

Such cameras are equipped with an objective lens turret head, in the turret plate of which there are firmly installed objective lens front attachments. The basic objective lens inserted into the camera has an arrangement for variable distance-setting which can only be used when the objective lens front attachments are not in use. The set picture-taking distance can thus only be read off if pictures are taken without using the objective lens front attachments in front of the basic objective lens. For pictures to be taken with the objective front attachments in use the basic objective lens has a fixed focus catch, by means of which it is held in the fixed focus position. Thus a variable distance-setting is not possible when the objective front attachments are used. Similarly, the depth-of-focus set in each case cannot be read off. Thus with these cameras when the objective front attachments are used it is not possible to take close-up pictures, so that the possibilities of their use are substantially limited.

For the removal of the defects of these known cameras it has already been proposed to operate the distance-setting arrangement of the basic objective lens of a photographic camera through a distance-setting lever, one end of which is constructed as an index mark cooperating with distance scales mounted on the turret plate. The distance scales allow for the picture-taking focal lengths which are formed by the basic objective lens and the objective front attachments, the front attachments being firmly arranged on the turret plate. The possibility of the indication of the depth-of-focus set in each case has not been solved by this means.

Now the present invention is based upon the problem of providing the possibility of distance-setting and reading off of depth-of-focus in a photographic camera, the focal length of which is different when using each of objective front attachments mounted on the objective turret head.

In accordance with the invention this problem is solved by using a distance-setting ring rotatably mounted on the objective turret head and connected with the distance-setting arrangement of the basic objective lens through transmission means.

A constructional example of the invention is explained in greater detail hereinafter by reference to drawings, wherein.

Figure 1:
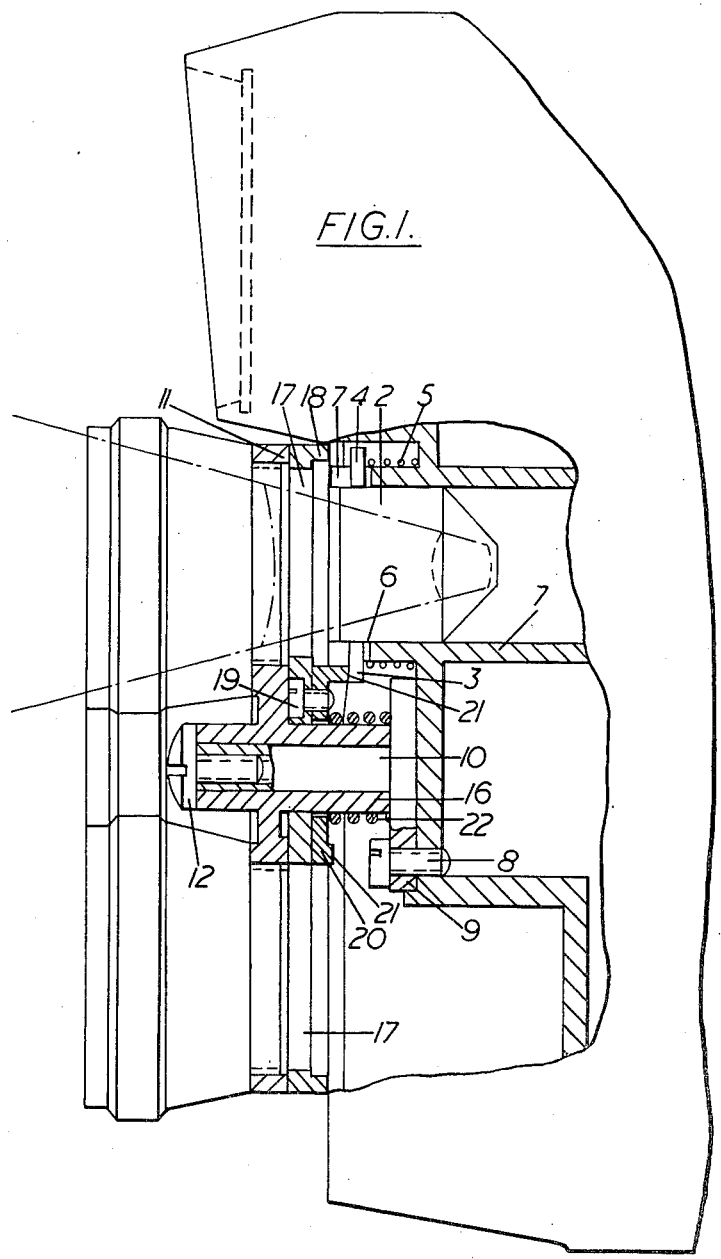
FIGURE 1 shows a camera with the objective turret head in accordance with the invention in section.
Figure 2:
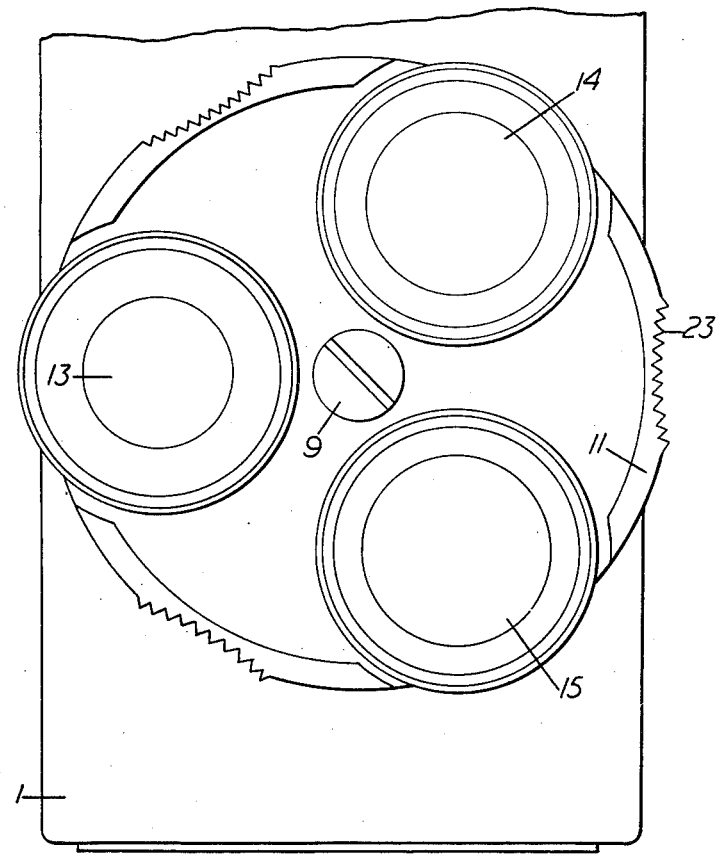
FIGURE 2 shows a part of the front elevation of the camera.
Figure 3:
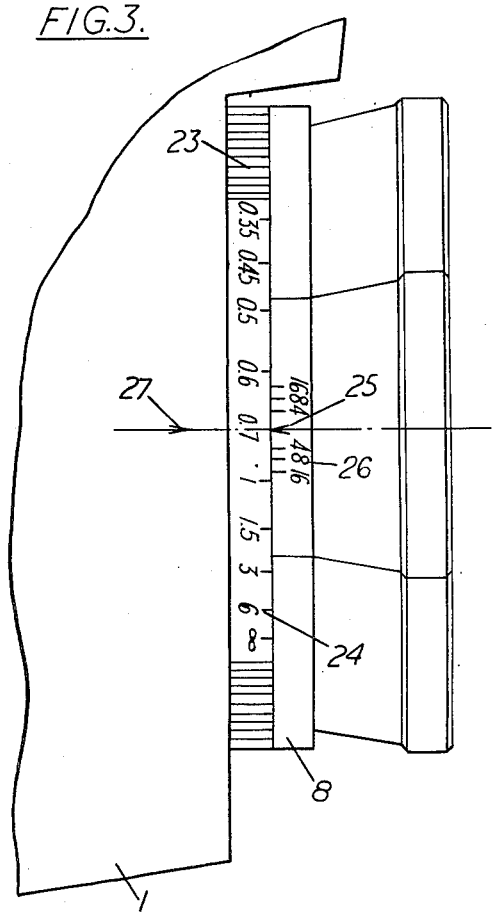
FIGURE 3 shows a lateral elevation of the camera with objective turret head.

In the housing 1 of a photographic camera there is axially movably mounted a basic objective lens 2. On the basic objective lens 2 there are secured a distance setting member in the form of a pin 3, and a further pin 4, against which a compression spring 5 bears, which spring in turn bears against the housing 1 of the camera. These pins 3 and 4 are guided in slots 6 and 7 which are provided in the housing 1. The basic objective lens 2 comprises an objective diaphragm aperture actuated by the exposure control arrangement of the camera, which diaphragm, like the pertinent control arrangement, is constructed in known manner and is not illustrated in detail here. In the housing 1 of the camera there is further screwed by means of securing screws 8 a flange 9, on the journal-like projection 10 of which an objective head 11 is rotatably mounted and secured by means of a retaining screw 12. The objective head 11 carries objective front attachments 13, 14, 15. On an extension, constructed as bush 16, of the objective head 11 there is rotatably mounted a distance-setting ring 18 provided with passage apertures 17 for the objective ray paths. The distance-setting ring 18 is connected by means of securing screws 19 with a cam ring 20 and is rotatable through approximately 90° relative to the objective head 11 (stop limitation not shown). The cam ring 20 carries control cams 21 which shift the basic objective lens 2 axially through the pin 3, that is to say set it to the desired distance, and are adapted to the individual objective front attachments 13, 14, 15. A spring 22 urges the cam ring 20 and the distance-setting ring 18 against the objective head 11, so that this ring is entrained with the objective head 11 by friction during rotation of the head 11 to change the focal length and carries out the same rotary movement as the objective head 11. The distance-setting ring 18 possesses at its periphery gripping grooves 23 which assist rotation by hand. The ring 18 carries distance scales 24 which cooperate with index marks 25 mounted on the periphery of the objective head 11 and diaphragm scales 26 which permit both reading off of the picture-taking distance set in each case and also of the depth-of-focus. The distance scales 24 are allocated to each front attachment and allow for the resultant focal lengths which are produced by the basic objective lens with the selected objective front attachment.

A marking 27 mounted on the housing 1 of the camera indicates which distance scale is valid for the objective front attachment situated in the picture-taking position in each case.

For the change of focal length the objective head 11 is to be rotated until a different objective front attachment 13, 14 or 15 stands before the basic objective lens 2 of the camera. Thus the exposure scale 24 of the distance-setting ring 18 which corresponds to the currently effective picture-taking focal length formed by the objective front attachment 13, 14 or 15 which has come into the picture-taking position and the basic objective lens 2 comes into the position indicated by the marking 27. By rotating the distance-setting ring 18 it is now possible to set the basic objective lens 2 to the desired distance, which can be read off on this distance scale 24 with the assistance of the index mark 25, in that through the control cams 21 of the cam ring 20 the pin 3 and thus the basic objective lens 2 are shifted axially. After the size of the diaphragm aperture of the basic objective lens 2, indicated in known manner in the camera view-finder (not shown), has been set and read off, the depth-of-focus available in each case for picture-taking can be read off with the aid of the diaphragm scale 26 of the objective head 11 on the distance scale 24 precisely indicated by the marking 27.

By appropriate design and arrangement of the control cams 21 of the cam ring 20 it is possible to adjust the basic objective lens 2 to a selected distance setting, rotate the objective head 11 and still maintain the selected distance-setting despite the change of focal length.

I claim:

1. A photographic camera comprising a housing, a basic objective lens mounted in the housing so as to be axially adjustable, an objective head rotatably mounted on the housing, a plurality of objective lens front attachments mounted on the objective head, the axis of rotation of said head being such that the head can be rotated into selected positions in which any of said front attachments is in axial alignment with the basic objective lens, a distance setting ring rotatably mounted on the objective head so as to be rotatable over a limited angle relative to said head, a distance setting member mounted on the basic objective lens for effecting distance adjustment of said basic objective lens and a transmission means for transmitting adjustment movements of said distance setting ring to said distance setting member, said transmission means being mounted on the distance setting ring and co-acting with said distance setting member in all said selected positions.

2. A photographic camera comprising a housing, a basic objective lens mounted in the housing so as to be axially adjustable, an objective head rotatably mounted on the housing, a plurality of objective lens front attachments mounted on the objective head, the axis of rotation of said head being such that the head can be rotated into selected positions in which any of said front attachments is in axial alignment with the basic objective lens, a distance setting ring rotatably mounted on the objective head so as to be rotatable over a limited angle relative to said head, a distance setting member mounted on the basic objective lens for effecting distance adjustment of said basic objective lens, a transmission means for transmitting adjustment movements of said distance setting ring to said distance setting member, said transmission means being mounted on the distance setting ring and co-acting with said distance setting member in all said selected positions, a plurality of distance scales formed on the periphery of the distance setting ring, which distance scales correspond to the picture-taking focal lengths formed by the basic objective lens and the objective front attachments, index marks formed on the periphery of the objective head and diaphragm scales formed on the periphery of the objective head, said index marks and diaphragm scales co-operating with the distance scales so that both the distance-setting and the depth-of-focus set can be read off.

3. A photographic camera comprising a housing, a basic objective lens mounted in the housing so as to be axially adjustable, an objective head rotatably mounted on the housing, a plurality of objective lens front attachments mounted on the objective head, the axis of rotation of said head being such that the head can be rotated into selected positions in which any of said front attachments is in axial alignment with the basic objective lens, a distance setting ring rotatably mounted on the objective head so as to be rotatable over a limited angle relative to said head, a distance setting members mounted on the basic objective lens for effecting distance adjustment of said basic objective lens, a transmission means for transmitting adjustment movements of said distance setting ring to said distance setting member, said transmission means being mounted on the distance setting ring and co-acting with said distance setting member in all said selected position, said distance setting member being in the form of a pin, said transmission means being in the form of a cam ring said cam ring comprising a plurality of control cams corresponding in number to the number of said front attachments and a spring urging said pin against said control cams.

4. A photographic camera comprising a housing, a basic objective lens mounted in the housing so as to be axially adjustable, an objective head rotatably mounted on the housing, a plurality of objective lens front attachments mounted on the objective head, the axis of rotation of said head being such that the head can be rotated into selected positions in which any of said front attachments is in axial alignment with the basic objective lens, a distance setting ring rotatably mounted on the objective head so as to be rotatable over a limited angle relative to said head, a distance setting member mounted on the basic objective lens for effecting distance adjustment of said basic objective lens, a transmission means for transmitting adjustment movements of said distance setting ring to said distance setting member, said transmission means being mounted on the distance setting ring and co-acting with said distance setting members in all said selected positions, an extension formed on the objective head and a spring mounted on the extension and arranged to urge the distance setting ring into frictional engagement with the objective head.

5. A photographic camera comprising a housing, a basic objective lens mounted in the housing so as to be axially adjustable, an objective head rotatably mounted on the housing, a plurality of objective lens front attachments mounted on the objective head, the axis of rotation of said head being such that the head can be rotated into selected positions in which any of said front attachments is in axial alignment with the basic objective lens, a distance setting ring rotatably mounted on the objective head so as to be rotatable over a limited angle relative to said head, a distance setting member mounted on the basic objective lens for effecting distance adjustment of said basic objective lens, a transmission means for transmitting adjustment movements of said distance setting ring to said distance setting member, said transmission means being mounted on the distance setting ring and co-acting with said distance setting member in all said selected positions, an extension formed on the objective head and a spring mounted on the extension and arranged to urge the distance setting ring into frictional engagement with the objective head, said distance setting ring being rotatably mounted on said extension.

References Cited in the file of this patent

UNITED STATES PATENTS

| | | |
|---|---|---|
| 2,832,274 | Lorenz | Apr. 29, 1958 |
| 2,865,274 | Richartz | Dec. 23, 1958 |
| 2,912,911 | Miller | Nov. 17, 1959 |
| 2,949,074 | Gebele | Aug. 16, 1960 |